United States Patent
Wieth et al.

(10) Patent No.: US 7,579,967 B2
(45) Date of Patent: *Aug. 25, 2009

(54) METHOD AND SYSTEM FOR DETECTING AND REWARDING THE RETURNING OF SHOPPING CARTS

(75) Inventors: Franz Wieth, Puchheim (DE); Horst Sonnendorfer, Puchheim (DE)

(73) Assignee: systec POS-Technology GmbH, Puchheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/850,198

(22) Filed: Sep. 5, 2007

(65) Prior Publication Data

US 2008/0021782 A1    Jan. 24, 2008

Related U.S. Application Data

(63) Continuation of application No. 10/019,142, filed as application No. PCT/EP01/04512 on Apr. 20, 2001, now Pat. No. 7,292,158.

(30) Foreign Application Priority Data

| Apr. 20, 2000 | (DE) | 100 19 941 |
| Apr. 20, 2000 | (DE) | 100 19 942 |
| Apr. 20, 2000 | (DE) | 100 19 944 |

(51) Int. Cl.
G08G 1/123 (2006.01)

(52) U.S. Cl. ........... 340/988; 340/691.1; 340/5.91

(58) Field of Classification Search ........ 340/988, 340/568, 572.1, 691.1, 568.5, 568.6, 568.7, 340/568.8, 572.8, 5.9, 426.2, 5.92, 5.91
See application file for complete search history.

(56) References Cited

U.S. PATENT DOCUMENTS

| 3,882,982 | A | * | 5/1975 | Smith | 194/211 |
| 3,897,863 | A | * | 8/1975 | Peggs | 194/212 |
| 3,938,638 | A | | 2/1976 | Moule | |
| 4,470,495 | A | * | 9/1984 | Unger | 194/205 |
| 4,868,544 | A | * | 9/1989 | Havens | 340/568.5 |
| 5,397,882 | A | | 3/1995 | Van Solt | |
| 5,402,106 | A | * | 3/1995 | DiPaolo et al. | 340/568.5 |
| 5,637,846 | A | | 6/1997 | Boers et al. | |
| 5,848,399 | A | * | 12/1998 | Burke | 705/27 |
| 5,921,373 | A | | 7/1999 | Amdahl et al. | |
| 6,045,039 | A | * | 4/2000 | Stinson et al. | 235/379 |
| 6,206,165 | B1 | * | 3/2001 | Lenander | 194/213 |

(Continued)

FOREIGN PATENT DOCUMENTS

DE    69215842    5/1997

(Continued)

*Primary Examiner*—Benjamin C Lee
*Assistant Examiner*—Daniel Previl
(74) *Attorney, Agent, or Firm*—Volpe and Koenig, P.C.

(57) ABSTRACT

A method and a system for detecting and rewarding the returning of shopping carts to the supermarket collection points is provided. During shopping, a first signal A is generated. When a shopping cart is returned, a signal B is generated. These two signals A and B are correlated either in the supermarket or in an information device that the customer carries with him or her, in order to deliver a reward for returning the shopping cart. When the first signal A is generated, the customer or an information device carried with the customer is identified. Alternatively, the signal is provided to the customer at the supermarket checkout so that the customer himself/herself can take steps for the correlation of the signal A with the signal B that is still to be obtained.

7 Claims, 6 Drawing Sheets

U.S. PATENT DOCUMENTS

| | | |
|---|---|---|
| 6,486,768 B1 | 11/2002 | French et al. |
| 6,533,168 B1 * | 3/2003 | Ching .................. 235/375 |
| 6,578,012 B1 | 6/2003 | Storey |
| 6,704,039 B2 | 3/2004 | Pena |

FOREIGN PATENT DOCUMENTS

| | | |
|---|---|---|
| DE | 69310758 | 9/1997 |
| DE | 19720527 | 11/1998 |
| DE | 19812496 | 9/1999 |
| EP | 0374877 | 6/1990 |
| EP | 0435225 | 7/1997 |
| WO | 9851197 | 11/1998 |
| WO | 0016271 | 3/2000 |

* cited by examiner

METHOD AND SYSTEM FOR DETECTING AND REWARDING THE RETURNING OF SHOPPING CARTS

CROSS REFERENCE TO RELATED APPLICATION(S)

This application is a continuation of U.S. patent application Ser. No. 10/019,142, filed Apr. 15, 2002, which is incorporated by reference as if fully set forth.

BACKGROUND

This invention pertains to a method for detecting and rewarding the return of shopping carts to the collection points provided for them at a shopping center, wherein during shopping a first signal A is generated and when the shopping cart is returned to a collection point a second signal B is generated, and wherein the two signals A and B are correlated to issue a bonus. Also, the invention pertains to a system to carry out the method, with a number of shopping carts, and at least one collection point for the shopping carts, with a first detection means to generate a first signal A during shopping and with a second detection means to generate a second signal B at the return of the shopping cart to a collection point, as well as with a data processing unit to correlate the two signals A and B to issue a bonus.

Shopping centers designed for self-service are generally interested in customers using a shopping cart to go shopping. This increases customer comfort level, minimizes the danger of damage to the goods being obtained by being dropped and above all, provides a certain level of protection against conscious or unconscious theft. These shopping carts are made available to the customers for the duration of their shopping experience, and are normally kept in collection points where the customer can take one with them to go shopping. However, most customers leave the shopping carts where they had been unloaded; i.e. usually right in the middle of the parking lot of the shopping center. This results in frustrating obstructions and to some extent also to damage to customers' vehicles so that additional personnel must be on hand to gather the abandoned shopping carts at regular intervals and bring them back to the collection points.

In order to compel the customer to return the used shopping cart to the collection point and not just leave it, a successful method in recent years has been to use a lock box system. This allows the customer to remove a shopping cart from the collection point only if he has deposited a refundable coin into the lock box, which then releases the shopping cart. The customer only gets the refundable coin back when he returns the shopping cart and properly stores it there, i.e. normally pushing it into a stacked row of shopping carts, and coupling it to the immediately neighboring shopping cart.

The lock box system is, however, not accepted by all customers and is perceived to be a bother. Also, sometimes very cheap plastic discs are inserted into the lock boxes that mimic a refundable coin, but of course do not also function as an incentive to return the shopping cart correctly to the collection point. Also, it is normally desirable to prevent angering a customer prior to his shopping experience, which will always happen if he wants to use a shopping cart but doesn't have any of the correct refundable coins.

WO 98/51197 describes a system that seeks to avoid this disadvantage to the lock box system: what this publication discloses is a system to detect and reward the return of shopping carts to the collection points provided for them at the shopping center, with the system producing a first signal A without a deposit using electronic identification of the individual shopping carts and by electronically detecting their route when a particular shopping cart passes by the cash register of the shopping center and is electronically recognized. A second signal B is produced when the same cart is stored in a collection point, and is also electronically identified there and recognized in this manner. A central data processing unit receives both signals A and B, correlates them and issues a bonus. In general, the bonus is given out in the form of a credit certificate; it can also be credited to a customer card that is read in for this purpose.

This prior art according to WO 98/51197 does indeed avoid the disadvantages of the common lock box system described above; however, this carries with it a considerable cost since each shopping cart has to be equipped with an electronic apparatus that communicates wirelessly with the respective detection means to generate the signals A and B. In addition to the costs that are incurred for each shopping cart, there is the danger of damage to the electronic components due to the shopping carts not always being treated gently. Finally, there must be a separate energy source for reliable functioning of this known system, which because of the mobile nature must consist of batteries, which has corresponding maintenance requirements.

SUMMARY

The object of this invention is thus to improve a method and a system to detect and reward the return of shopping carts of the type mentioned above with respect to installation and maintenance expenses, while maintaining the comfort for the customers.

This task is accomplished by a method with the features of the invention as well as by a system with the features of the invention.

Advantageous embodiments of the method are described herein; advantageous extensions of the system according to the invention are described herein.

According to the invention, the generation of signal A is established by the existence of a particular customer in the shopping center; the identification of a shopping cart with its associated disadvantages can be completely eliminated. The shopping carts common up until now can continue to be used unaltered.

The existence of a customer in the shopping center can, for example be detected by identifying the customer using optical recognition systems or by reading in a customer card when paying at the cash register of the shopping center—this is understood in the sense of the invention as a recognition or identification for the purposes of re-recognition—the actual identity of the customer does not have to be detected in the process. Alternatively, or in addition to this, the customer can obtain an information medium at the cash register such as some kind of refund card, or the event of the purchase is written onto a customer-owned data medium so that the customer carries with him signal A and correlates it with signal B when returning the shopping cart. The latter method has the advantage in that an identification of the customer is not necessary. Finally, the association of the first signal A according to the invention to the particular customer can also be done by identifying a particular data medium or write to it with signal A—independent of whether this data medium is being carried by its owner or by an authorized third party.

The customer-owned data medium spoken of can be a universally acceptable electronic data medium. It can also be a common customer card that is preferably provided with an electronic storage medium. It is also possible that the customer-owned data medium is a mobile telecommunication means, for example a mobile phone that communicates through the mobile radio network or directly over an infrared interface or the like with the data processing system of the shopping center.

By means of an optical recognition system, it is also possible to establish signal A with no information medium or data exchange with the customer at all. For example, a common CCD camera could individualize the customers during their purchases and when returning the shopping carts re-recognize them.

The principle according to the invention of establishing the generation of the first signal A based on the existence of the customer can be combined with a variety of ways to generate the second signal B.

It is possible to also establish the generation of the second signal B alone based on the existence of the customer at a shopping cart collection point, for example using the just mentioned optical recognition system. In this way, it can be provided that a customer who has finished shopping is also rewarded for returning a shopping cart that he didn't use. The storage and correlation of the two signals A and B can be done on the spot in a central data processing system at the shopping center or can be saved until the next time the customer goes shopping, whereupon he is credited a bonus. This would be a very comfortable way of rewarding the customer for returning shopping carts, since he doesn't have to worry about anything and doesn't have to carry with him an information medium or even a refundable coin. In order to give the customer control over the bonus credit certificate, the shopping center or the collection point can be provided with a read-out device to call up his bonus account; in addition it can be provided that the customer can call up his bonus account any time online, for example through the Internet.

On the other hand, the generation of the second signal B can also be established based on the shopping cart, wherein the fact that a shopping cart is stored in a collection point is the initiating event for signal B. If the customer carries an information medium with him on which the first signal A is recorded or stored, the second signal B can be issued at the collection point to this information medium and the two signals A and B can be correlated there and saved until the next purchase. To this end, the customer could for example insert a customer card, a special refund card or a universally accepted data medium into a read-write device at the collection point, thereby either reading out signal A to be correlated with signal B and saved in the central data processing system of the shopping center, or to likewise write signal B onto the information medium. The latter would provide the advantage in that the customer can take his bonus resulting from the correlation of the two signals A and B with him, and can even have it credited to him at other shopping centers if necessary. Writing to this type of information medium with the second signal can of course also be done wirelessly. In the process, it is advantageous if signal B is generated only if the shopping cart is actually properly returned, i.e. generally pushed into a stacked row. A test for proper stowage can, for example be done using a CCD camera, which recognizes whether the stacked row is being properly built, i.e. whether the distances are within prescribed tolerances, with the help of the handlebar of the shopping carts as well as their distance and/or their being parallel. In this way, it can be ensured that the shopping carts are not just haphazardly stored into the collection point, but that they are properly put away in a stacked row in order to issue the earned bonus.

It is also conceivable and covered by the invention that the customer is identified or individualized for a purchase and that signal A, for example, is sent to the shopping cart at the cash register. This can involve writing to a data medium fastened to the shopping cart; it is also possible to just identify the shopping cart, for example using a bar code, so as to "give" it signal A. At the moment when the shopping cart with signal A is returned to the collection point, the customer identified or individualized when signal A was generated can be credited a bonus at a central data processing system at the shopping center.

As already mentioned, the generation of the second signal B when a shopping cart is returned to a collection point can be done to provide for a reward for returning foreign, abandoned shopping carts. In this regard it makes sense if the second detection means for the generation of the second signal B detect not just the return of a shopping cart, but also its removal from the collection point and to take into account in generating the second signal B how long the respective shopping cart had been outside of a collection point; this can prevent a bonus from being obtained surreptitiously in that a shopping cart is removed from a collection point and returned to it right away. Alternatively, or in combination with this, in generating the second signal B the fact of whether or not the returned shopping cart had been used previously for a purchase can be taken into account. This presumes that the removal of the shopping cart from the collection point and/or the presence of a shopping cart in the shopping center is detected, for example by "marking" the cart when it is removed from the collection point and/or when paying at the cash register, or is identified accordingly, for example using a bar code that can be read by optical recognition systems.

A very simple example application of the invention is to issue an information medium for the first signal A to the customer at the checkout stand in the shopping center. When the shopping cart is returned, the second signal B is recorded onto it, resulting in the customer receiving a bonus when he returns the information medium with the recorded second signal B. This information medium can be a common chip card; it can also be a card with an optically readable impression or with a changeable layer of color. The information medium can, for example, be given the second signal by being inserted into a device similar to those of known lock boxes on the shopping cart, thereby receiving the signal B as soon as the shopping cart is properly put away in the collection point, i.e. it has been pushed into the stacked row.

The information medium can, for example, also be a parking card that is issued to the customer when he drives into the parking lot of the shopping center, and which must be returned when leaving the parking lot. This parking card can be coded with signal A at purchase at the cash register, whereupon it receives signal B when the shopping cart is properly returned to the collection point. When the customer drives out of the parking lot, the guard or automated system releasing the vehicles recognizes that the parking card is coded with signals A and B and issues a bonus. The system functions in this way even if no separate parking card is issued for entering and leaving the customer parking lot, but a customer-owned data medium, in particular a chip card/credit card is used. Since this card is simultaneously individualized to the customer, signals A and B do not absolutely have to be saved on this card to receive a bonus when driving out of the parking lot; the data processing system of the shopping center can recognize this customer when he pays, returns the shopping cart and when he exits the customer parking lot by means of his card. If the customer pays for his purchases on a cashless basis using this card just mentioned, the bonus can also be deducted from the total amount of the purchase that the customer has bought by cashless means. Alternatively, it is also conceivable that the customer will not have to pay a fee for the use of the parking lot if he has properly returned the shopping cart to its collection point. The bonus issued for the return of a shopping cart can of course also be a credit certificate that the customer brings with him to his next purchase.

This invention is particularly advantageous to implement when a customer-owned data medium is carried with him. Since it seems that a universal platform standard for electronic, wireless read-write data medium is going to be developed, one can assume that soon every customer of the shopping center will be carrying with him this type of data medium. In the meantime, a shopping center or a chain of shopping centers can also issue special data media for the bonus system. If signals A and B are not stored and/or linked in a data processing system of the shopping center, but on the customer-owned data medium, the customer can take the bonus with him and be credited at another store of the same chain. It is helpful if the signals A and B are each stored together with a time stamp on the customer-owned data medium in order to only have to issue the bonus when there is a temporal relationship between the first signal A for the purchase and the second signal B for the return of any shopping cart to any collection point.

To protect against manipulations to customer-owned data media, signals A and B recorded on them can in addition be filed soon after their generation in a storage medium owned by the store, in particular a central data processing system, thus a random sampling method as needed.

The system according to the invention can be designed such that it can be reprogrammed at any time depending on the need and on local conditions with regard to the generation and storage of signals A and B. The storage can, for example, be done only on the customer-owned data medium, or only in the store-owned central computer, or can be stored in both; concerning this programmability, it can also be provided that the store-owned central computer communicates with its central computer for the purposes of bonus transfers to another shopping center.

The customer-owned data medium can, of course, also be a mobile telecommunication means, for example a common mobile phone. This has a number of advantages: in particular a mobile phone can communicate through the mobile radio network with the data processing system of the shopping center telephonically, which automatically individualizes the customer by means of his mobile phone. However, direct communication, for example of a mobile phone with an infrared interface between it and the data processing system of the shopping center is also conceivable. Here as well, the communication technology is already available; the mobile phone individualizes itself through the device's number, which in turn has the advantage in that the customer can be safely re-recognized with this exact mobile phone if he returns his shopping cart or any shopping cart to the collection point, whereas at the same time no conclusion can be drawn as to the identity of the customer as can be done using the mobile telephone number. On the other side, there are already payment systems that use the individualization of a customer through his mobile phone to make a cashless payment by entering a corresponding PIN number into the mobile phone at the cash register of the shopping market. The method according to the invention combines tremendously well with this system: if the customer has paid at the cash register of the shopping center using his mobile phone, this mobile phone only has to be re-recognized when the customer returns the shopping cart to initiate the issuance of a bonus. This can then be deducted on the spot from the amount of the purchase that is charged to the customer through cashless payment if selected.

Finally, the bonus to be issued to the customer can in addition be determined depending on data on the scope, the makeup and/or the time point of the purchase. This makes it possible, for example, to promote selected products or to issue some kind of volume discount. Furthermore, the reward could be based on the time stamp if the purchase had taken place outside of peak shopping times: an even flow of customers would enable the number of open registers to be reduced and to reduce the necessary work force in a supermarket, for example.

If the detection means of the system are split up and one part, namely a signal transmitter, is located in the shopping center or at the collection point and another part of the detection means, namely an optical detector, is attached to the shopping cart, no store-owned data processing system is needed to be in connection with the first and the second detection means: the cooperation of the optical detector on a shopping cart with the optical signal transmitter in the shopping center generates signal A, which the customer can take with him, preferably by directly writing to a customer-owned data medium with signal A. A shopping cart of this type can then generate signal B when it receives a light signal from the second optical signal transmitter at the collection point, and can also issue it to a customer-owned data medium. The customer-owned data medium can, for example, be a chip card that is inserted into a read-write device on the shopping cart or at the collection point. This can also be a universally accepted data medium as well, which is wirelessly provided with signals A and B. The optical signal transmitters used to do this work preferably in the infrared range and are thus invisible to the customers. Alternatively, there is very little cost, but nonetheless high reliability involved with the optical signal transmitter in the shopping center and/or the optical signal transmitter at the collection point being formulated by modulating the normal pre-existing lighting. The modulated light signal can then initiate the generation of signals A and B in a detector attached to the shopping cart.

It is noted, of course, that in a shopping center a combination of the various possibilities for the implementation of the invention can also exist. Since not every customer, for example, has a mobile telephone, it is advantageous if the system according to the invention can, for example, both carry out communications with a customer-owned mobile telephone as well as function with an information medium issued by the shopping center to the customer.

BRIEF DESCRIPTION OF THE DRAWING(S)

A preferred embodiment for a system according to the invention is explained in more detail below with the help of the attached drawings. Shown are:

DETAILED DESCRIPTION OF THE PREFERRED EMBODIMENT(S)

Figure 1:
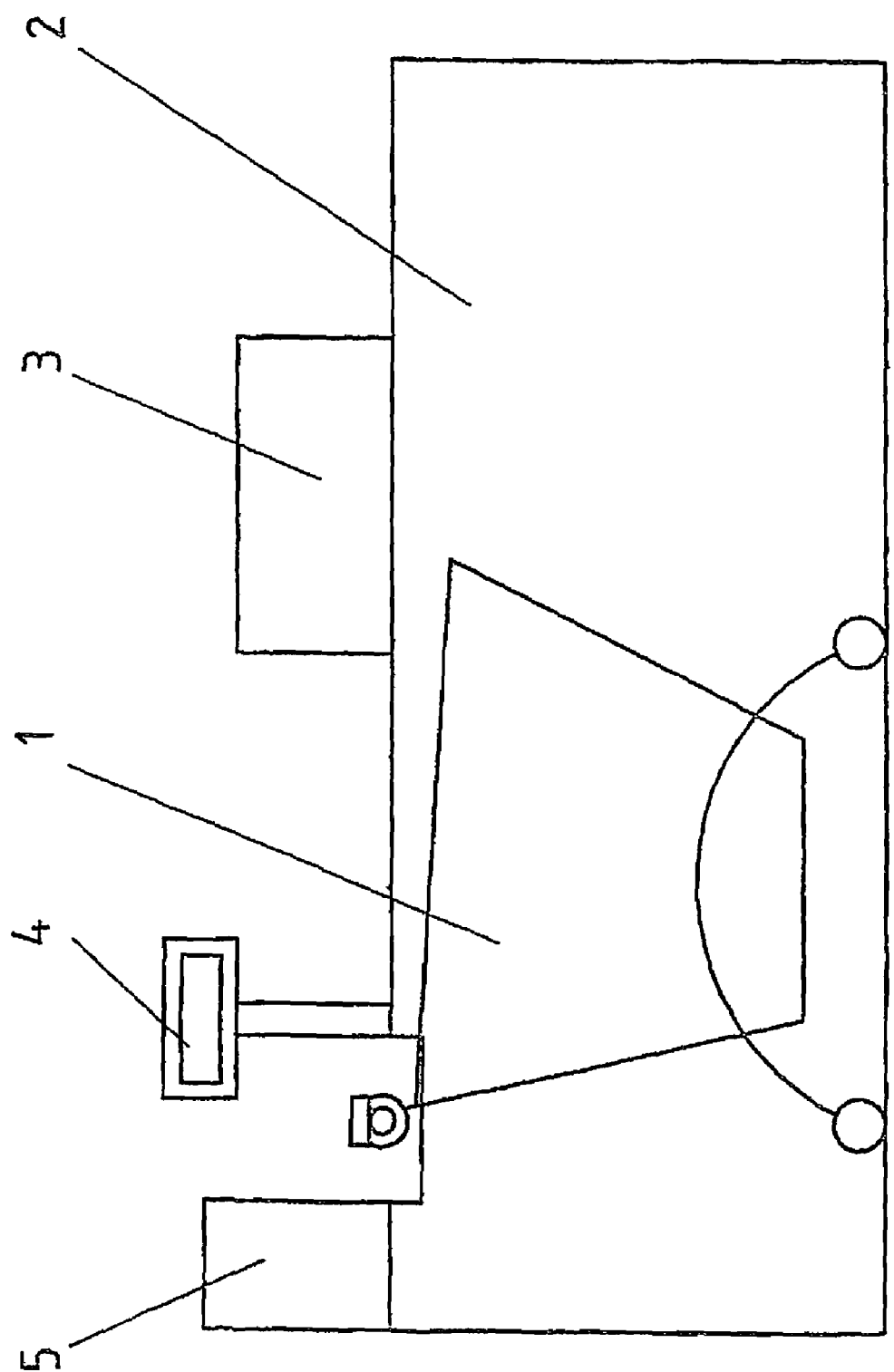
FIG. 1 is a schematic view of a check-out which provides the generation of the first signal A.

FIG. 1 shows a shopping cart 1 in schematic representation at a cash register 2 of a shopping center. The cash register is provided with a scanner 3 and a display 4, as is common practice. A first detection means 5 is provided so as to detect the passing of a customer identification card (not shown) containing a transponder (also not shown), to link this to data obtained from the cash register 2 concerning the completed purchase, and to forward it as a signal A to a central data processing system in the shopping center.

Figure 2:
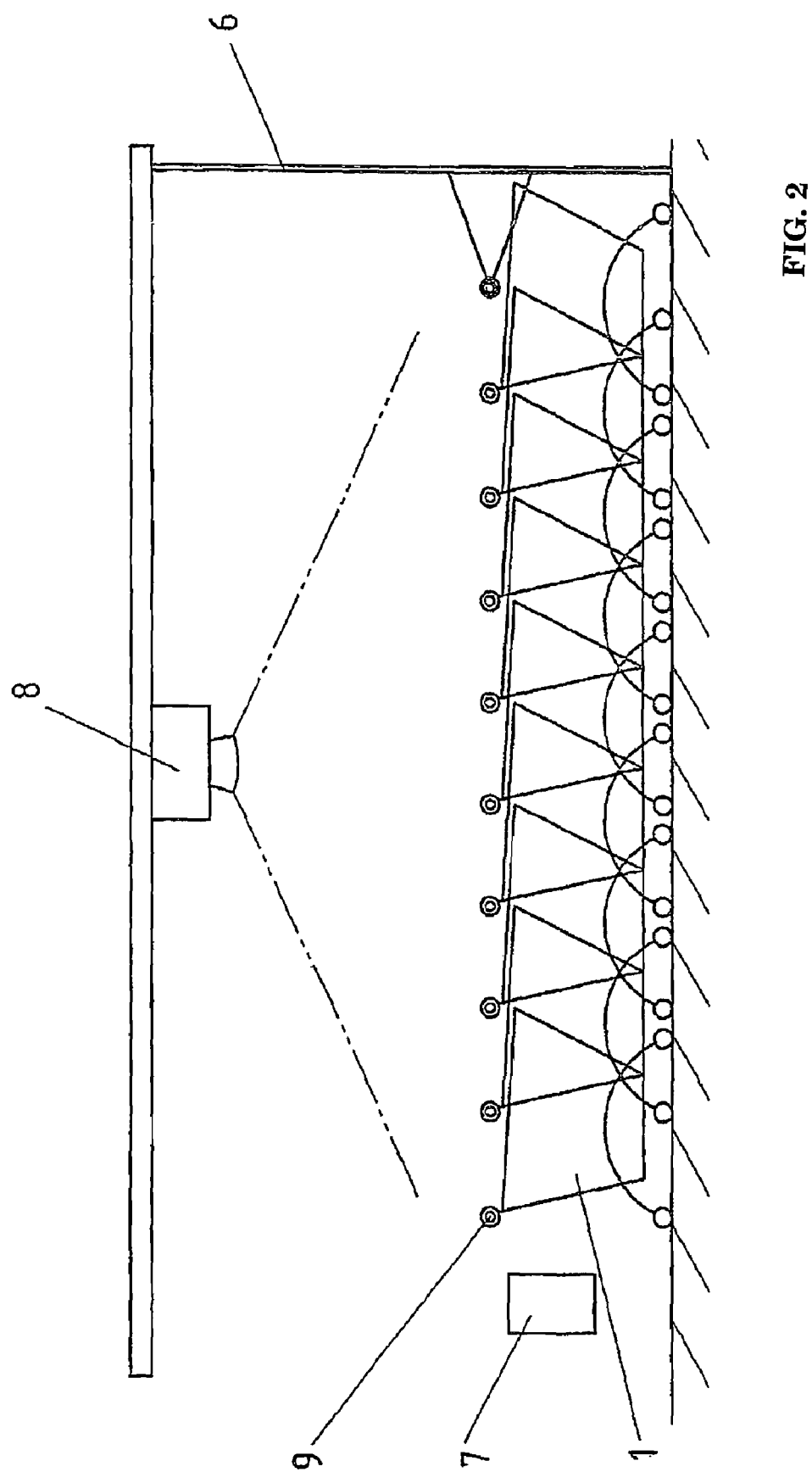
FIG. 2 is a schematic view of a cart return area which provides the generation of the second signal B.

FIG. 2 shows schematically a collection point 6 with a stacked row of shopping carts 1 indicated. In the entryway of the collection point 6 are second detection means 7 that register, as in the first detection means 5 did at the cash register 2, the presence of a customer identification card. A CCD camera 8 located in the ceiling of the collection point 6 monitors the proper storage of a shopping cart 1 into the stacked row, which occurs when the handle 9 of a newly arriving shopping cart 1 is aligned at a prescribed distance and orientation with the handle of the other shopping carts. If the data on orientation and distance are within the prescribed tolerances, the second detection means 7 generates the second signal B and sends it in turn to the central data processing system of the shopping center. There, a bonus is determined and saved for the next time the customer goes shopping with the same identification card.

FIGS. 3a, 3b, 3c, and 3d show various examples for a customer-owned data medium onto which signals A and B can be written, or with which the customer can identify himself in the shopping center.

Figure 3A:
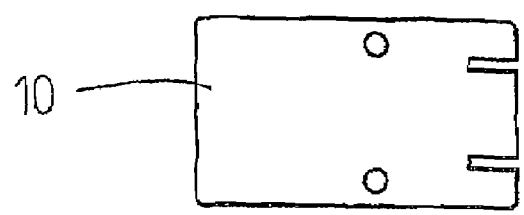
FIGS. 3a, 3b, 3c, 3d are views of different customer-owned data medium.

FIG. 3a shows a refund card designed as a hole card 10. The customer receives this card with signal A when paying at the cash register of the shopping center or previously, such as when driving into the customer parking lot and carries it with him to the collection point for the shopping carts. The collection point can then be designed such that the hole card 10 is inserted into a bonus-issuing device and then the shopping cart is properly put away at the collection point. The bonus-issuing device then draws in the hole card 10 and in its place issues a credit certificate. Alternatively the hole card 10 can also be provided with an identity and when exiting the customer parking lot be re-issued.

Figure 3B:
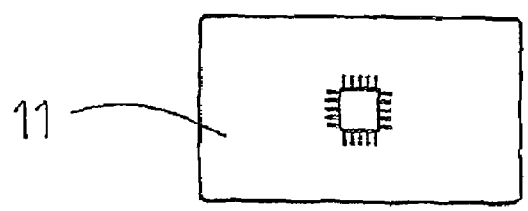
Figure 3C:
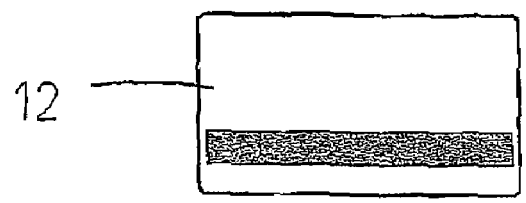

FIG. 3b shows a chip card 11, whereas FIG. 3c depicts a magnetic strip card 12. These two cards can either serve as mere customer identification cards. The chip card 11 in particular can be provided with a transponder for wireless identification, and the magnetic strip card 12 has to be pulled through a card reader. Both cards 11 and 12 can also be written to with information, in particular with the signal A and/or signal B.

Figure 3D:
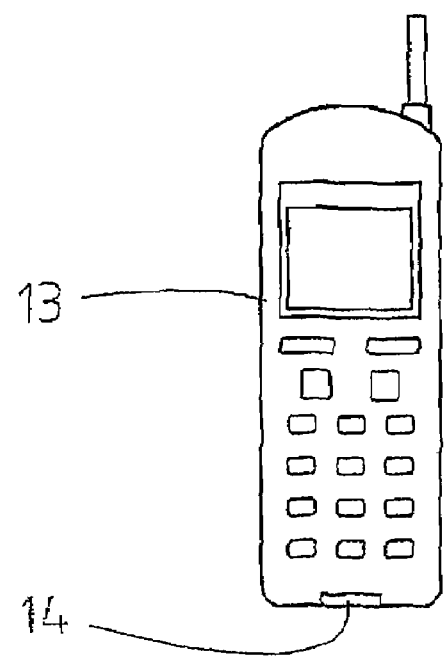

FIG. 3d shows, finally, a mobile phone 13 that functions as a customer-owned data medium that can communicate through an infrared interface 14 or through the mobile radio network with the central data processing system of the shopping center, thereby individualizing the customer for generation of signals A and B as well as for the crediting of the bonus. The signals A and B are of course preferred to be automatically and wirelessly generated; however it would be the most technically inexpensive if signals A and B consisted of a series of numbers that is reported to the customer at the cash register or at the collection point and which the customer then would have to enter using the keyboard of the mobile phone.

Figure 4:
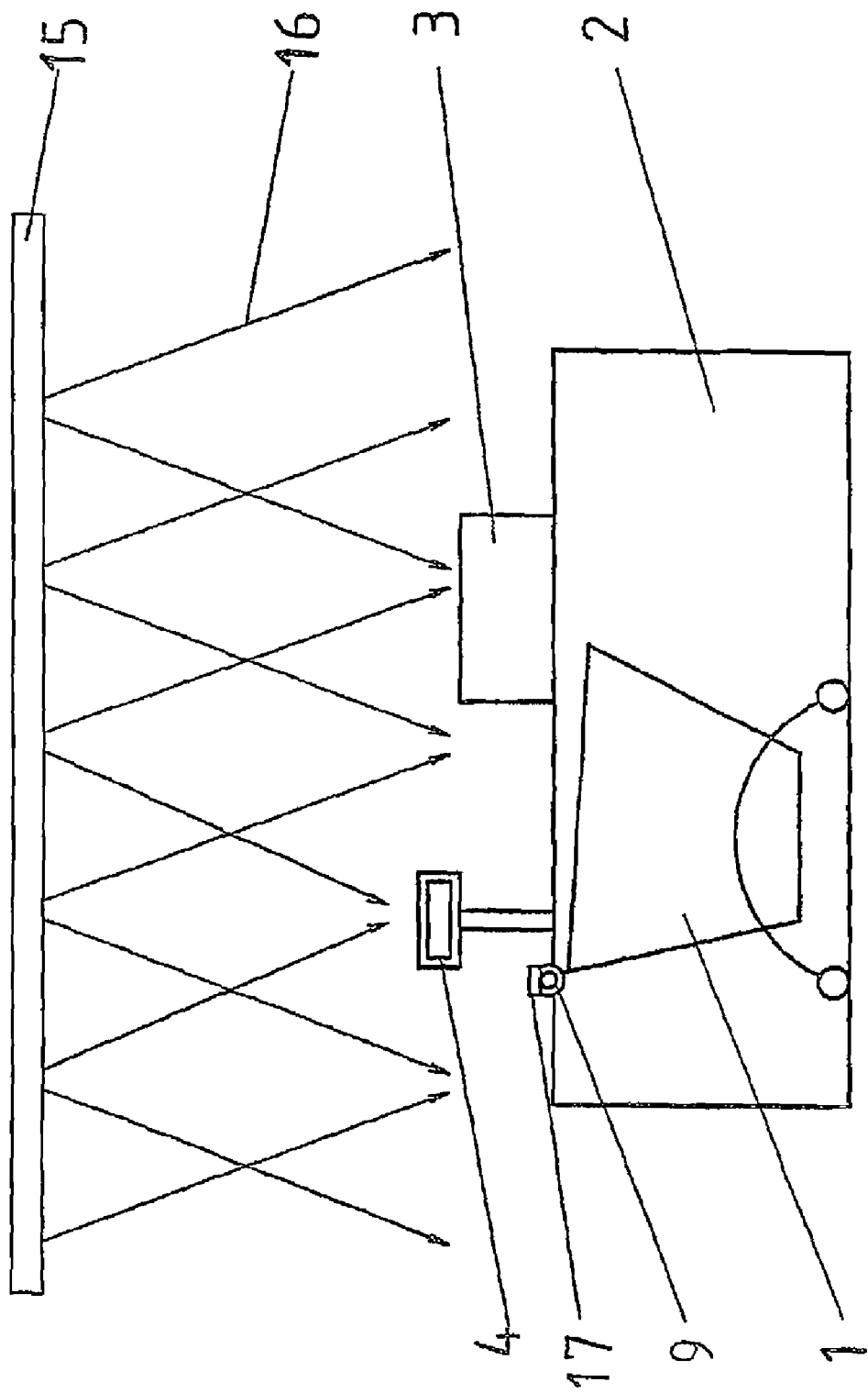
FIG. 4 is a schematic view of a check-out with an alternative generation of the first signal A.

FIG. 4 shows another embodiment of the invention in a schematic representation similar to that in FIG. 1. The same components are identified with the same reference numerals. The difference from the embodiment described in FIG. 1 is that above the cash register area there is a first signal transmitter 15 that issues a first light signal 16 in the infrared range. This first light signal 16 arrives at a detector 17 that is attached to the handle 9 of the shopping cart 1. The detector 17 recognizes from the first light signal 16 that the shopping cart 1 is located at the cash register and accordingly that a purchase is being made. It therefore generates signal A and forwards it to a customer card.

Figure 5:
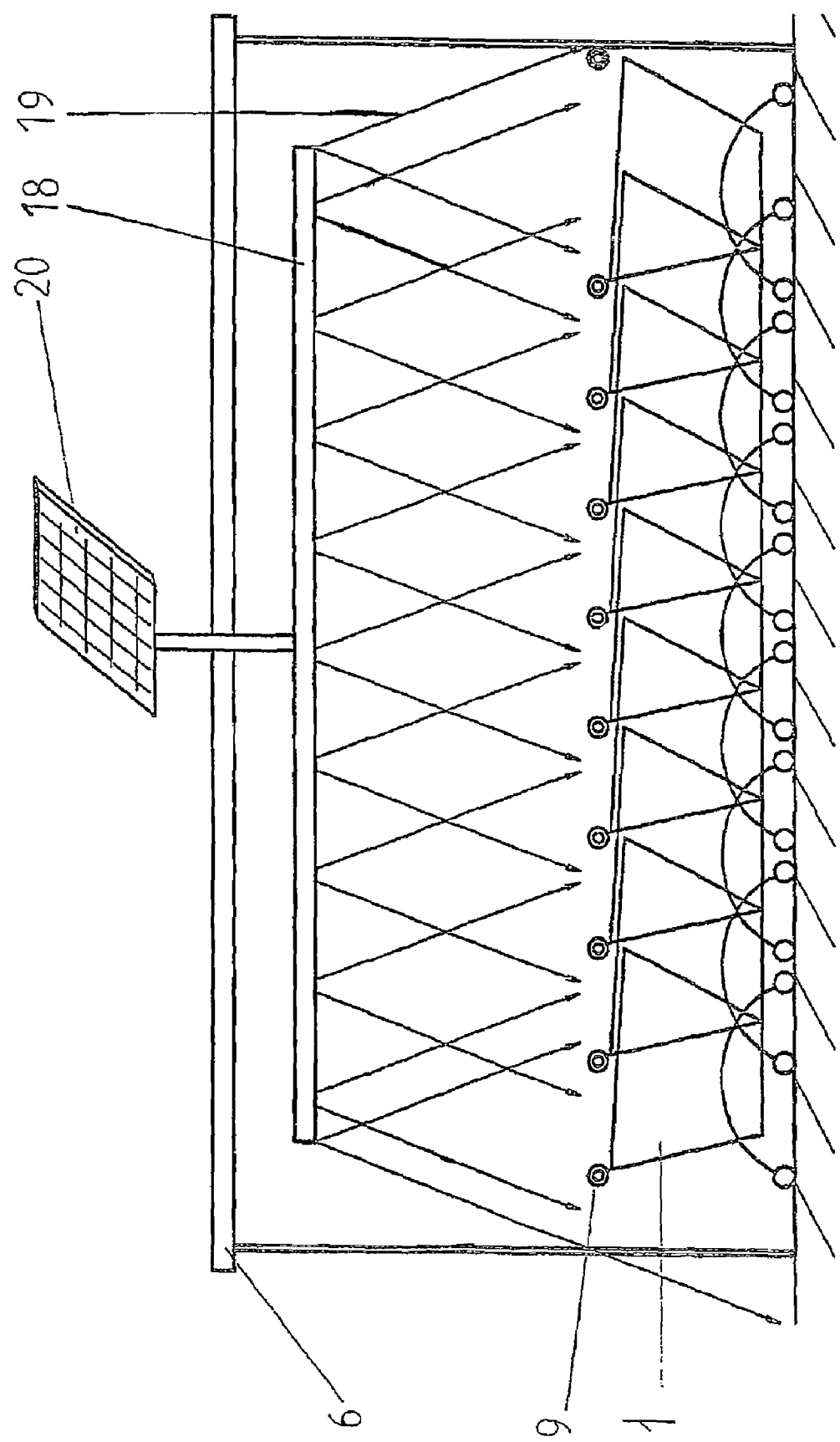
FIG. 5 is a schematic view of a cart-return with an alternative generation of the second signal B.

FIG. 5 shows schematically a collection point 6 with a stacked row of shopping carts 1 into which the shopping cart 1 of the type shown in FIG. 4 provided with signal A is to be stored. Above the stacked row of shopping carts 1 is a second signal transmitter 18 that is designed similar to the first signal transmitter 15 and that sends a second light signal 19 to the handle 9 of the shopping cart 1. A solar module 20 is provided on the roof of the collection point 6 to provide power to this second signal transmitter 18. If now the shopping cart 1 of the type shown in FIG. 4 is stored in the collection point 6, the detector 17 that carries signal A receives the second light signal 19, recognizes that the shopping cart 1 has been properly stored in a collection point 6 and generates signal B to forward to a customer card.

Figure 6:
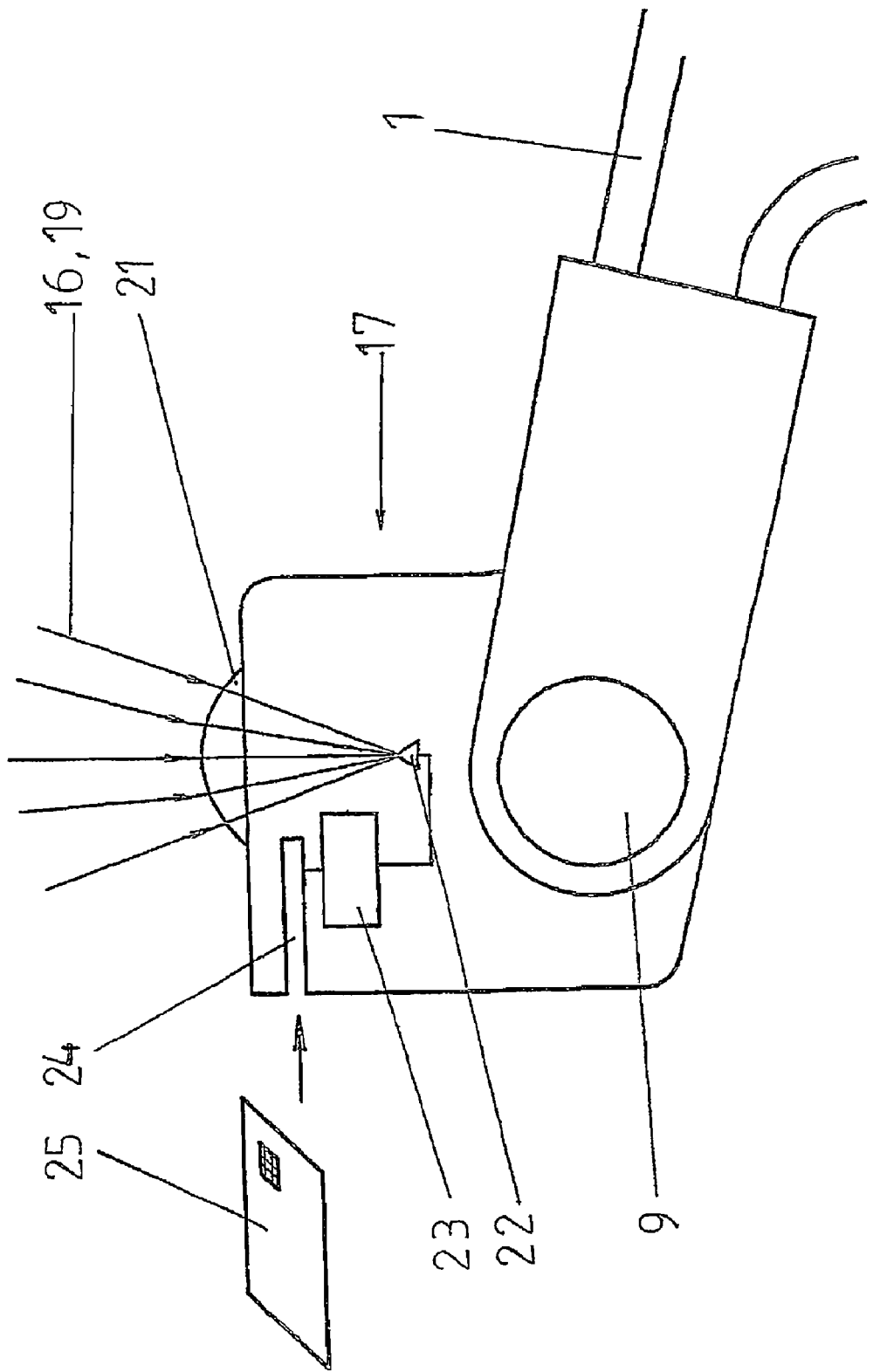
FIG. 6 is a schematic detail representation of the handle area of a shopping cart.

FIG. 6 shows in a schematic representation the functionality of the detector 17 on the handle 9 of the shopping cart 1 of FIGS. 4 and 5 more precisely: the first light signal 16 or the second light signal 19 arrives at a converging lens 21 of the detector 17 and is deflected by this to a photo diode 22. The photo diode 22 cooperates with an evaluation circuit 23 and recognizes whether the light signal is the first 16 or the second 19. The evaluation circuit 23 generates signal A or signal B for transfer to a customer card. A chip card 25 of the customer can be inserted in a read-write device 24 of the detector 17, onto which the signals A and B are written. The correlation of signals A and B is done later when the chip card 25 is read out. After successfully writing to the chip card 25, which for example can be indicated using a short acoustic signal, it can be removed by the customer again. When presenting the chip card 25 with signals A and B, the customer gets a credit certificate as a bonus for the proper return of the shopping cart 1 to the collection point 6.

What is claimed is:

1. A method to detect and reward the return of shopping carts to collection points at a shopping center, wherein during a purchase, a first signal A is automatically generated and when a shopping cart is returned to a collection point, a second signal B is automatically generated, and wherein the two signals A and B are correlated to issue a bonus, comprising;
    establishing the generation of the first signal A by optical recognition;
    assigning the first signal A to a certain customer by identifying or individualizing physical characteristics of the customer via data transmitted by the optical recognition;
    establishing the generation of the second signal B by optical recognition;
    assigning the second signal B to a certain customer by identifying or individualizing physical characteristics of the customer via data transmitted by the optical recognition; and
    correlating the first signal A with the second signal B.

2. A method according to claim 1, further comprising generating the second signal B when any shopping cart is returned to a collection point.

3. A method according to claim 2, further comprising
only generating the second signal B when the returned shopping cart had previously been located outside of the collection point for longer than a preset time period.

4. A method according to claim 2, further comprising
only generating the second signal B when the shopping cart had been previously used to go shopping.

5. A method according to claim 1, wherein the identified physical characteristics of the customer are biometric characteristics.

6. A system for detecting and rewarding the returning of shopping carts to a collection point, comprising a first detection means (5) to automatically generate a first signal A during a purchase and a second detection means (7) to automatically generate a second signal B when a shopping cart (1) is returned to a collection point (6), and a data processing unit to correlate the two signals A and B to issue a bonus, the first detection means (5) is for establishing the generation of the first signal A by optical recognition and for assigning the first signal A to a certain customer by identifying or individualizing physical characteristics of the customer via data transmitted by the first detection means (5); and the second detection means (7) is for establishing the generation of the second signal B by optical recognition and for assigning the second signal B to a certain customer by identifying or individualizing physical characteristics of the customer via data transmitted by the second detection means (7).

7. A system according to claim 6, wherein the second detection means (18) further includes means for recognizing the orientation of a shopping cart within the collection point (6) to determine whether the returned shopping cart (1) has been stored into the shopping cart stacked row within a prescribed tolerance.

\* \* \* \* \*